US012720446B2

(12) United States Patent
Chang et al.

(10) Patent No.: US 12,720,446 B2
(45) Date of Patent: Aug. 25, 2026

(54) SAFETY REGULATION VERIFICATION METHOD FOR A MOBILE DEVICE, AND METHOD FOR DETERMINING A TRANSMITTING POWER UPPER LIMIT THEREOF

(71) Applicant: MEDIATEK Inc., Hsinchu City (TW)

(72) Inventors: Wei-Hsuan Chang, Hsinchu City (TW); Shih-Wei Hsieh, Hsinchu City (TW); Chih-Wei Chiu, Hsinchu City (TW); Cheng-Han Lee, Hsinchu City (TW); Chih-Wei Lee, Hsinchu City (TW); Shyh-Tirng Fang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 310 days.

(21) Appl. No.: 18/395,858

(22) Filed: Dec. 26, 2023

(65) Prior Publication Data

US 2025/0212138 A1 Jun. 26, 2025

(51) Int. Cl.
*H04W 52/36* (2009.01)
*H04W 52/28* (2009.01)

(52) U.S. Cl.
CPC ....... *H04W 52/367* (2013.01); *H04W 52/283* (2013.01)

(58) Field of Classification Search
CPC .............. G01R 29/0857; H04B 17/102; H04B 1/3838; H04W 12/30; H04W 12/06;
(Continued)

(56) References Cited

U.S. PATENT DOCUMENTS 9,253,733 B1 2/2016 Lee et al.
12,587,219 B2 * 3/2026 Yoo ...................... H04B 1/0078
(Continued)

FOREIGN PATENT DOCUMENTS

CN 112929955 A 6/2021
CN 116347324 A 6/2023
WO 2014154068 A1 10/2014

OTHER PUBLICATIONS

EP Search Report dated May 23, 2025 in EP application No. 24223176.9-1206.
(Continued)

*Primary Examiner* — Cindy Trandai
(74) *Attorney, Agent, or Firm* — McClure, Qualey & Rodack, LLP

(57) ABSTRACT

A safety regulation verification method comprises: measuring a first transmitting power of the antenna module at a trigger distance of a proximity sensor of the mobile device; obtaining a power density design target contour based on the first transmitting power at a predetermined distance from the mobile device on a chosen surface; obtaining a distance sensing plane coverage of the proximity sensor at the predetermined distance from the mobile device on the chosen surface; comparing whether the distance sensing plane coverage surrounds the power density design target contour; and when the distance sensing plane coverage of the proximity sensor fails to surround the power density design target contour, adjusting the first transmitting power as a second transmitting power until the distance sensing plane coverage surrounds the power density design target contour.

20 Claims, 5 Drawing Sheets

(58) Field of Classification Search
CPC ......... H04W 72/0473; H04W 72/1263; H04W 52/367; H04W 52/283
See application file for complete search history.

(56) References Cited

U.S. PATENT DOCUMENTS

| | | | | |
|---|---|---|---|---|
| 2011/0019775 | A1* | 1/2011 | Ruscitto | H04B 7/0874 375/340 |
| 2018/0323657 | A1* | 11/2018 | Hannigan | H02J 50/23 |
| 2020/0389856 | A1* | 12/2020 | Yao | H04B 17/21 |
| 2022/0263531 | A1* | 8/2022 | Chen | H01Q 1/245 |
| 2022/0264481 | A1* | 8/2022 | Caporal Del Barrio | H04W 52/367 |
| 2022/0386249 | A1* | 12/2022 | Meshkati | H04W 52/44 |
| 2023/0093016 | A1* | 3/2023 | Shi | H04L 41/12 370/329 |
| 2023/0120500 | A1 | 4/2023 | Ramadan | |
| 2023/0232334 | A1* | 7/2023 | Nielsen | H04W 52/146 455/522 |
| 2024/0056978 | A1* | 2/2024 | Sridharan | H04W 52/0274 |
| 2024/0204815 | A1* | 6/2024 | Ramadan | H04W 52/246 |
| 2024/0302480 | A1* | 9/2024 | Bao | G01S 5/0072 |

OTHER PUBLICATIONS

TW Office Action dated Dec. 19, 2024 in Taiwan application No. 113103953.

* cited by examiner

S4
S2
S6
600
S5
500
S1
S3

SAFETY REGULATION VERIFICATION METHOD FOR A MOBILE DEVICE, AND METHOD FOR DETERMINING A TRANSMITTING POWER UPPER LIMIT THEREOF

TECHNICAL FIELD

The disclosure relates in general to a safety regulation verification method for a mobile device and a method for determining a transmitting power upper limit of an antenna module of a mobile device thereof.

BACKGROUND

The frequency bands for 5G New Radio (5G NR), the radio access technology for 5G mobile networks, are divided into two distinct ranges. The first range, known as Frequency Range 1 (FR1), encompasses sub-6 GHz frequency bands. Some of these bands have been traditionally utilized by previous standards but have now been expanded to potentially incorporate new spectrum offerings ranging from 410 MHz to 7125 MHz. The second range, referred to as Frequency Range 2 (FR2) or millimeterWave (mmW), covers frequency bands spanning from 24.25 GHz to 71.0 GHz. Additionally, frequency bands within the sub-6 GHz range are also allocated for non-terrestrial networks.

Currently, the certification process for distance sensing only focuses on the FR1 frequency band (such as FCC KDB 616217). However, the safety regulations for Specific Absorption Rating (SAR) in FR1 and Power Density (PD) in FR2 have distinct characteristics. Therefore, there needs a certification process specifically designed for distance sensing in millimeter-wave antenna modules to ensure compliance with safety regulations.

Also, how to improve distance sensing plane coverage of the millimeter-wave antenna modules having proximity sensing feature to increase the transmitting power of the millimeter-wave antenna modules is one of the industry efforts.

SUMMARY

According to one embodiment, a safety regulation verification method for a mobile device is provided. The mobile device comprises an antenna module. The safety regulation verification method comprises: measuring a first transmitting power of the antenna module at a trigger distance of a proximity sensor of the mobile device; obtaining a power density design target contour based on the first transmitting power at a predetermined distance from the mobile device on a chosen surface; obtaining a distance sensing plane coverage of the proximity sensor at the predetermined distance from the mobile device on the chosen surface; comparing whether the distance sensing plane coverage surrounds the power density design target contour; and when the distance sensing plane coverage of the proximity sensor fails to surround the power density design target contour, adjusting the first transmitting power as a second transmitting power until the distance sensing plane coverage surrounds the power density design target contour.

In some embodiments, after the step of adjusting the first transmitting power as the second transmitting power, determining a transmitting power upper limit based on the second transmitting power, and when the distance sensing plane coverage surrounds the power density design target contour, determining the transmitting power upper limit based on the first transmitting power. In some embodiments, the step of adjusting the first transmitting power comprises: directly reducing the first transmitting power or reducing the trigger distance to reduce the first transmitting power. In some embodiments, the transmitting power upper limit is determined as being equal to the first transmitting power or the second transmitting power. In some embodiments, the proximity sensor is integrated in the antenna module, or the proximity sensor is external to the antenna module and adjacent to the antenna module. In some embodiments, further comprising: obtaining another power density design target contour at the determined distance from the mobile device on another chosen surface; obtaining another distance sensing plane coverage of the proximity sensor at the predetermined distance from mobile device on the another chosen surface; comparing the another distance sensing plane coverage and the another power density design target contour on the another chosen surface; determining another transmitting power upper limit according to the comparing result; and selecting the smallest value from the transmitting power upper limit and another transmitting power upper limit as a final transmitting power upper limit. In some embodiments, when the antenna is at the first transmitting power, a maximum power density obtained on a plane at the trigger distance is less than or equal to a power density design target. In some embodiments, the power density design target contour is a contour including a plurality of points on the chosen surface equal to a power density design target. In some embodiments, the distance sensing plane coverage of the proximity sensor is a closed shape obtained by mapping a proximity sensing feature of the proximity sensor on the chosen surface at the predetermined distance from the mobile device.

According to an alternative embodiment, provided is a method for determining a transmitting power upper limit of a mobile device. The mobile device comprises an antenna module. The method comprises: measuring a first transmitting power of the antenna module at a trigger distance of a proximity sensor of the mobile device; obtaining a power density design target contour based on the first transmitting power at a predetermined distance from the mobile device on a chosen surface; obtaining a distance sensing plane coverage of the proximity sensor at a predetermined distance from the mobile device on the chosen surface; comparing the distance sensing plane coverage and the power density design target contour on the chosen surface; and determining the transmitting power upper limit according to the comparing result.

In some embodiments, the step of comparing the distance sensing plane coverage and the power density design target contour on the chosen surface comprises: comparing whether the distance sensing plane coverage surrounds the power density design target contour. In some embodiments, when the distance sensing plane coverage fails to surround the power density design target contour, adjusting the first transmitting power as a second transmitting power until the distance sensing plane coverage surrounds the power density design target contour, and determining the transmitting power upper limit based on the second transmitting power, and when the distance sensing plane coverage surrounds the power density design target contour, determining the transmitting power upper limit based on the first transmitting power. In some embodiments, the step of adjusting the first transmitting power comprises: directly reducing the first transmitting power or reducing the trigger distance to reduce the first transmitting power. In some embodiments, the transmitting power upper limit is determined as being equal to the first transmitting power or the second transmitting power. In some embodiments, the trigger distance of the proximity sensor is a pre-determined distance; or the trigger distance is determined corresponding to a proximity feature of the proximity sensor. In some embodiments, the proximity sensor is integrated in the antenna module, or the proximity sensor is external to the antenna module and adjacent to the antenna module. In some embodiments, further comprising: obtaining another power density design target contour at the determined distance from the mobile device on another chosen surface; obtaining another distance sensing plane coverage of the proximity sensor at the predetermined distance from the mobile device on the another chosen surface; comparing the another distance sensing plane coverage and the another power density design target contour on the another chosen surface; determining another transmitting power upper limit according to the comparing result; and selecting the smallest value from the transmitting power upper limit and another transmitting power upper limit as a final transmitting power upper limit. In some embodiments, when the antenna is at the first transmitting power, the power density obtained on a plane at the trigger distance is less than or equal to a power density design target. In some embodiments, the power density design target contour is a contour including a plurality of points on the chosen surface equal to a power density design target. In some embodiments, the distance sensing plane coverage of the proximity sensor is a closed shape obtained by mapping a proximity sensing feature of the proximity sensor on the chosen surface at the predetermined distance from the mobile device.

According to another embodiment, provided is a method for determining a transmitting power upper limit of an antenna module, the method comprising: measuring a first transmitting power of the antenna module at a trigger distance of a proximity sensor; obtaining a power density design target contour based on the first transmitting power at a predetermined distance from the antenna module on a chosen surface; obtaining a distance sensing plane coverage of the proximity sensor at a predetermined distance from the antenna module on the chosen surface; comparing the distance sensing plane coverage and the power density design target contour on the chosen surface; and determining the transmitting power upper limit according to the comparing result.

In some embodiments, the step of comparing the distance sensing plane coverage and the power density design target contour on the chosen surface comprises: comparing whether the distance sensing plane coverage surrounds the power density design target contour. In some embodiments, when the distance sensing plane coverage fails to surround the power density design target contour, adjusting the first transmitting power as a second transmitting power until the distance sensing plane coverage surrounds the power density design target contour, and determining the transmitting power upper limit based on the second transmitting power, and when the distance sensing plane coverage surrounds the power density design target contour, determining the transmitting power upper limit based on the first transmitting power. In some embodiments, the step of adjusting the first transmitting power comprises: directly reducing the first transmitting power or reducing the trigger distance to reduce the first transmitting power. In some embodiments, the transmitting power upper limit is determined as being equal to the first transmitting power or the second transmitting power. In some embodiments, the trigger distance of the proximity sensor is a pre-determined distance; or the trigger distance is determined corresponding to a proximity feature of the proximity sensor. In some embodiments, the proximity sensor is integrated in the antenna module, or the proximity sensor is external to the antenna module and adjacent to the antenna module. In some embodiments, further comprising: obtaining another power density design target contour at the determined distance from the antenna module on another chosen surface; obtaining another distance sensing plane coverage of the proximity sensor at the predetermined distance from the antenna module on the another chosen surface; comparing the another distance sensing plane coverage and the another power density design target contour on the another chosen surface; determining another transmitting power upper limit according to the comparing result; and selecting the smallest value from the transmitting power upper limit and another transmitting power upper limit as a final transmitting power upper limit. In some embodiments, when the antenna is at the first transmitting power, the power density obtained on a plane at the trigger distance is less than or equal to a power density design target. In some embodiments, the power density design target contour is a contour including a plurality of points on the chosen surface equal to a power density design target. In some embodiments, the distance sensing plane coverage of the proximity sensor is a closed shape obtained by mapping a proximity sensing feature of the proximity sensor on the chosen surface at the predetermined distance from the antenna module.

Figure 1:
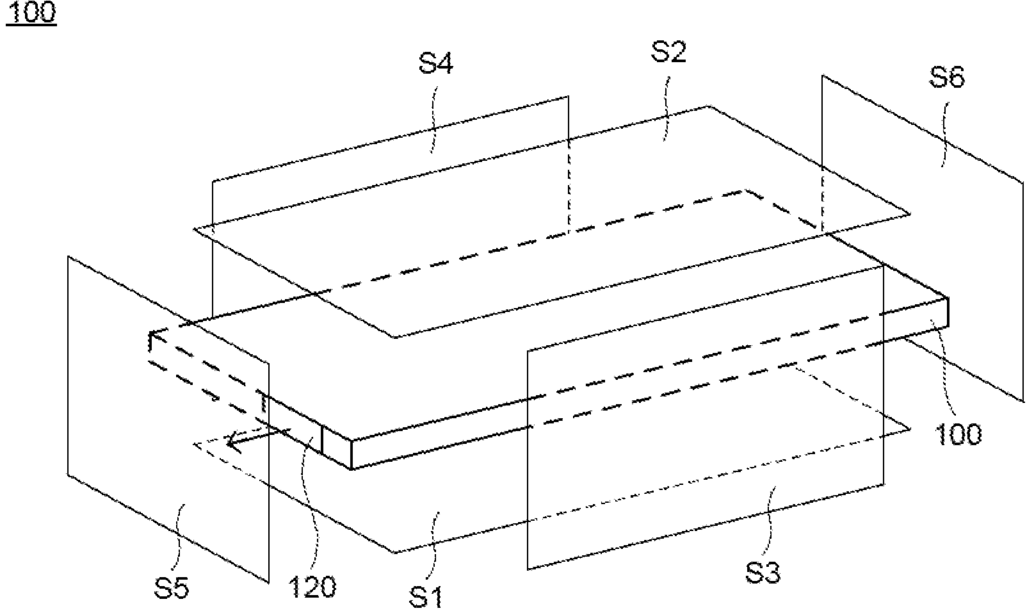
FIG. 1 shows an electronic mobile device according to one embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

In compliance with safety regulations, it is possible to increase the transmitting power of the antenna. Compliance with safety regulations typically involves limits on electromagnetic radiation and human exposure to ensure that the use of wireless devices does not pose a risk to human health. Specific limits and standards are set based on regulations and standards in different countries, such as specific bit rates, power density, or specific absorption rates.

If the relevant regulations and standards are met and the device passes the necessary testing and certification, it is permissible to increase the transmitting power of the antenna within the defined safety limits. However, it is important to ensure that such an increase does not exceed the limits set by regulations and standards and does not have any adverse effects on users or the surrounding environment. Therefore, it is recommended to conduct appropriate testing and verification before increasing the transmitting power of the antenna to ensure compliance with safety regulations.

FIG. 1 shows an electronic mobile device according to one embodiment of the application. The electronic mobile device (or mobile device) 100 according to one embodiment of the application includes an antenna module 120 and other elements (not shown). The antenna module 120 is for example but not limited by, millimeterWave (mmW) module. Surfaces S1~S6 are the outer surfaces of the electronic mobile device 100. In FIG. 1, the position of the antenna module 120 on the electronic mobile device 100 is just for example but not to limit the application.

As shown in FIG. 1, the antenna module 120 radiates toward the surface S5. In some embodiments, the mobile device 100 includes a proximity sensor (p-sensor) that can sense the distance between the target object (such as an object or a human body) and the proximity sensor. In some embodiments, the proximity sensor is integrated in the antenna module 120. In other embodiments, the proximity sensor is located external to the antenna module 120 and adjacent to the antenna module 120. In one embodiment of the application, the proximity sensor integrated in the antenna module is taken as an example to illustrate, which is not to limit the application. For instance, the antenna module 120 has a proximity sensing feature, or in other words, the antenna module 120 has the proximity sensor (p-sensor). When the antenna module 120 emits radiation, which may have adverse effects on humans, it is necessary to lower the transmitting power of the antenna module 120 when the antenna module 120 having the proximity sensor (p-sensor) detects that the distance between the human body and the antenna module 120 is too close.

Figure 2:
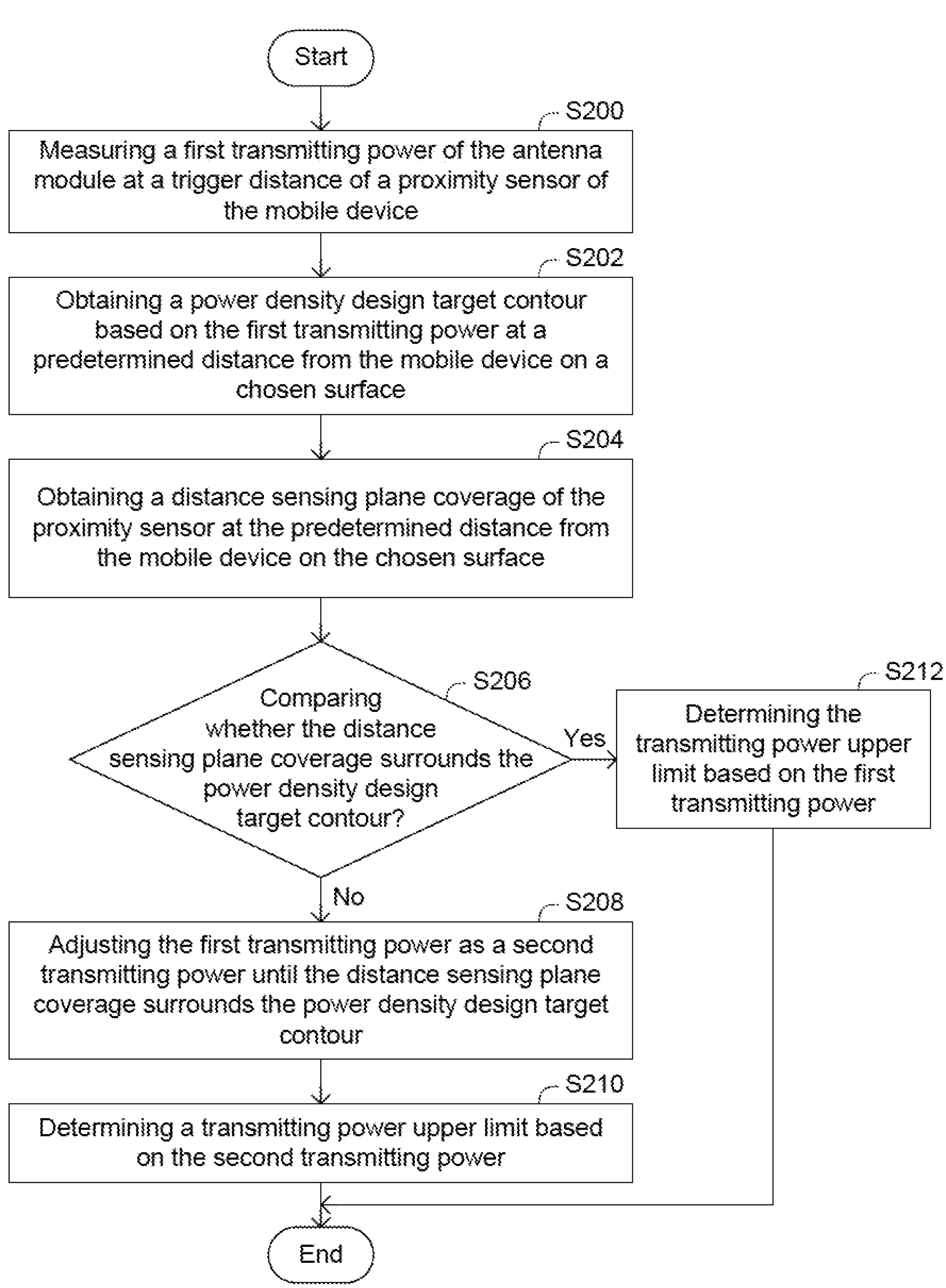
FIG. 2 shows a safety regulation verification method for the antenna module having the proximity sensing feature according to one embodiment of the application.

FIG. 2 shows a safety regulation verification method for the mobile device 100 having the proximity sensing feature according to one embodiment of the application. The chosen surfaces for safety regulation verification will depend on the position of the antenna module 120. In FIG. 1, for example, the surfaces S1, S2 and S5 will be chosen one-by-one for safety regulation verification.

In step S200, a first transmitting power of the antenna module 120 at a trigger distance of a proximity sensor of the mobile device 100 is measured.

In step S202, a power density design target contour is obtained based on the first transmitting power at a predetermined distance from the mobile device 100 on a chosen surface (for example but not limited by, the surfaces S1, S2 and S5 will be chosen one-by-one). The predetermined distance from the antenna module (or mobile device) 120 is for example but not limited by, 2 mm, which is a shortest allowable distance (or said a predetermined distance at the worst case) that radiation from the antenna module (or mobile device) does not harm the human body. In one embodiment of the application, on the power density distribution map, based on the predetermined power density design target, all points on the power density distribution that equal the predetermined power density design target are selected and connected to form the power density design target contour. That is, in one embodiment of the application, the power density design target contour is a contour including all points or a plurality of points on the chosen surface equal to the power density design target. In some embodiments, the power density design target may be a pre-determined value. The power density design target may be set according to the specification, for example, the power density design target is set equal to the upper limit specified in the specification, or the power density design target is set less than the upper limit specified in the specification.

In step S204, a distance sensing plane coverage of the proximity sensor at the predetermined distance from the mobile device 100 on the chosen surface is obtained. The distance sensing plane coverage of the proximity sensor is the mapping of the P-sensor's coverage range on the chosen surface. The distance sensing plane coverage of the proximity sensor is typically a closed-loop shape and may be either regular or irregular in shape. The distance sensing plane coverage of the proximity sensor is a closed shape obtained by mapping the proximity sensing feature of the proximity sensor on the chosen surface. The distance sensing plane coverage is defined as the p-sensor detection area capability at the predetermined distance (for example, 2 mm distance in worst case). The details for obtaining the distance sensing plane coverage of the P-sensor will not be discussed here.

In step S206, whether the distance sensing plane coverage surrounds the power density design target contour is compared.

When the distance sensing plane coverage of the P sensor fails to surround the power density design target contour (No in step S206), the first transmitting power is adjusted as a second transmitting power until the distance sensing plane coverage surrounds the power density design target contour in step S208. In Step S208, the step of adjusting the first transmitting power comprises: directly reducing the first transmitting power or reducing the trigger distance to reduce the first transmitting power until the distance sensing plane coverage surrounds the power density design target contour, and the second transmitting power is determined as the transmitting power upper limit. Also, when the distance sensing plane coverage surrounds the power density design target contour, the safety regulation verification is passed. The second transmitting power is less than the first transmitting power. In some embodiments, by reducing the first transmission power to the second transmission power, the power density design target contour (or the power density design target contour area) can be decreased so that the distance sensing plane coverage could surrounds the power density design target contour. In some embodiments, when the power density design target contour is equal to the distance sensing plane coverage on the chosen surface, it can be considered that the distance sensing plane coverage surrounds the power density design target contour.

After the step of adjusting (or reducing) the first transmitting power as the second transmitting power in step S208, a transmitting power upper limit is determined based on the second transmitting power in step S210. For example, the transmitting power upper limit is determined as being equal to the second transmitting power.

Still further, when the distance sensing plane coverage surrounds the power density design target contour (yes in step S206), which means the safety regulation verification is passed, the transmitting power upper limit is determined based on the first transmitting power in step S212. For example, the transmitting power upper limit is determined as being equal to the first transmitting power.

In some embodiments, the safety regulation verification method in FIG. 2 further includes: obtaining another power density design target contour at the determined distance from the antenna module (or mobile device) on another chosen surface (such as the surfaces S1, S2, S3 or S4); obtaining another distance sensing plane coverage of the proximity sensor at the predetermined distance from the antenna module (or mobile device, or P-sensor) on the another chosen surface; comparing the another distance sensing plane coverage and the another power density design target contour on the another chosen surface; determining another transmitting power upper limit according to the comparing result; and selecting the smallest value from the transmitting power upper limit and another transmitting power upper limit as a final transmitting power upper limit.

In the safety regulation verification method in FIG. 2 of one embodiment of the application, when the antenna is at the first transmitting power, a maximum power density obtained on a plane at the trigger distance is less than or equal to a power density design target.

In the safety regulation verification method in FIG. 2 of one embodiment of the application, the power density design target contour is a contour including a plurality of points on the chosen surface equal to a power density design target.

In the safety regulation verification method in FIG. 2 of one embodiment of the application, the distance sensing plane coverage of the proximity sensor is a closed shape obtained by mapping a proximity sensing feature of the proximity sensor on the chosen surface at the predetermined distance from the mobile device.

In one embodiment of the application, the power of the antenna module 120 is adjusted until the power density obtained at the trigger distance (5 cm) from the P-sensor is less than or equal to the value specified by the specification. At this point, the power of the antenna module 120 can be determined as the first transmitting power. The first transmitting power is used in the following operations. Adjusting the power of the antenna module 120 also provides a reference power density on the chosen plane in determining the power density design target contour.

Still further, in one embodiment of the application, at the predetermined distance (for example but not limited by, 2 mm) on the chosen plane, the power density design target contour formed based on the specified power density is obtained. In defining the power density design target contour, the power density corresponding to the first transmitting power on the chosen plane is taken as a reference to obtain the power density design target contour. The formation of the power density design target contour is determined according to the power density specified by the specification. However, the size of the power density design target contour on the chosen plane is influenced by the first transmitting power. Therefore, based on the first transmitting power, the power density design target contour on the chosen plane is determined based on the predefined power density design target. The predetermined distance on the chosen plane is 2 mm, and changes in distance result in variations in the power density.

In one embodiment of the application, basically, all surfaces S1-S6 are respectively chosen one-by-one to perform the safety regulation verification flow of FIG. 2. However, in order to skip the repeated safety regulation verification flow, the surface(s) which is/are too far away from the antenna module 120 is/are skipped in the safety regulation verification flow based on the position and the structure of the antenna module 120. For example, as shown in FIG. 1, the surfaces S1, S2 and S5 will be chosen one-by-one for safety regulation verification; while the surfaces S3, S4 and S6 (which are far away from the antenna module 120) will be skipped in the safety regulation verification.

Figure 3:
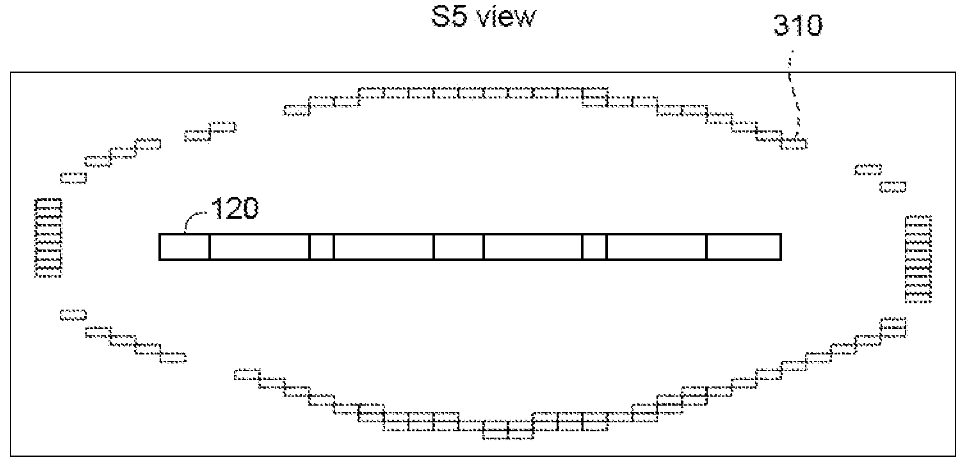
FIG. 3 and FIG. 4 show power density distribution map on the different chosen surfaces according to one embodiment of the application.
Figure 4:
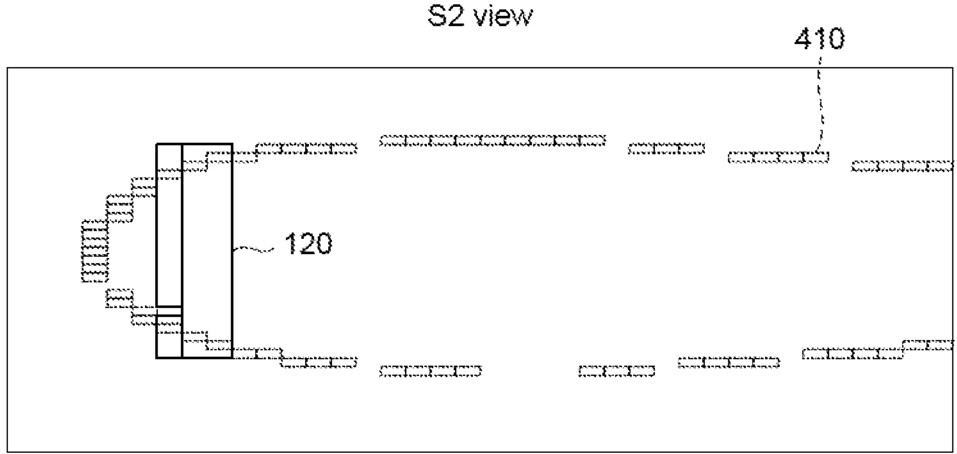

FIG. 3 and FIG. 4 show power density distribution map on the different chosen surfaces S5 and S2 according to one embodiment of the application. As discussed above, in one embodiment of the application, the safety regulation verification method for the mobile device further comprises: obtaining another power density design target contour at the predetermined distance from the antenna module (or mobile device) on another chosen surface; obtaining another distance sensing plane coverage of the proximity sensor at the predetermined distance from the antenna module (or mobile device, or proximity sensor) on the another chosen surface; comparing the another distance sensing plane coverage and the another power density design target contour on the another chosen surface; determining another transmitting power upper limit according to the comparing result; and selecting the smallest value from the transmitting power upper limit and another transmitting power upper limit as a final transmitting power upper limit. Details of these steps are described as below.

Please refer to FIG. 1, FIG. 2, FIG. 3 and FIG. 4. In FIG. 1, the antenna module 120 radiates toward the surface S5 while the antenna module 120 almost does not radiate toward the surface S2.

In some embodiments, when the surface S5 is chosen for the safety regulation verification, the trigger distance "X" is determined for example but not limited by, 5 cm; and the first transmitting power in the step S200 is temporarily set as 11.8 dBm. FIG. 3 also shows the power density design target contour 310 on the chosen surface S5. After the safety regulation verification flow in FIG. 2 is performed on the chosen surface S5, the transmitting power upper limit is marked as Plimit("X")_S5. The Plimit("X")_S5=11.8 dBm (equal to the first transmitting power) due to the distance sensing plane coverage (not shown) surrounds the power density design target contour 310. In some embodiments, the distance sensing plane coverage of the P-sensor is influenced by the shape of the antenna module 120. In some embodiments, the shape of the distance sensing plane coverage is similar to the shape of the power density design target contour 310. In some embodiments, as depicted in the embodiment of FIG. 3, it is assumed that the distance sensing plane coverage (not shown) surrounds the power density design target contour 310.

When the surface S2 is chosen for the safety regulation verification, the trigger distance "X" is determined for example but not limited by, 5 cm; and another first transmitting power in the step S200 is temporarily set as 11.8 dBm. FIG. 4 also shows the power density design target contour 410 on the chosen surface S2. During the safety regulation verification, the distance sensing plane coverage of the P-sensor on the chosen surface S2 is 0 $mm^2$ because the antenna module 120 does not face the chosen surface S2. When the another first transmitting power of the antenna module 120 is adjusted as 7.5 dBm, the power density design target area is 0 mm$^2$ and accordingly (i.e. to get smaller power density design target area), the distance sensing plane coverage of the P-sensor surrounds the power density design target contour (after the another first transmitting power of the antenna module 120 is adjusted as 7.5 dBm). In some embodiments, the distance sensing plane coverage of the P-sensor has 0 mm$^2$, and the power density design target area is 0 mm$^2$, since the two areas are equal, the distance sensing plane coverage surrounds the power density design target contour. Then, another transmitting power upper limit is determined as 7.5 dBm. Therefore, after the safety regulation verification flow in FIG. 2 is performed on the chosen surface S2, the transmitting power upper limit is marked as Plimit("X")_S2. The Plimit("X")_S2=7.5 dBm. In some embodiments, when the power density design target contour area is equal to the area of the distance sensing plane coverage on the chosen surface, it can be considered that the distance sensing plane coverage surrounds the power density design target contour.

Thus, the final transmitting power upper limit Plimit("X") for the antenna module 120 is determined as a smallest value among the respective transmitting power upper limits corresponding to the chosen surfaces. That is, in the above case, the transmitting power upper limit Plimit("X") for the antenna module 120 is a smaller value (7.5 dBm) among Plimit("X")_S5 (=11.8 dBm) and Plimit("X")_S2=(7.5 dBm).

In one embodiment of the application, in order to get more benefit from the antenna module (or P-sensor) having the proximity sensing features, the distance sensing plane coverage of the antenna module (or P-sensor) needs to improvement.

Figures 5, 6:
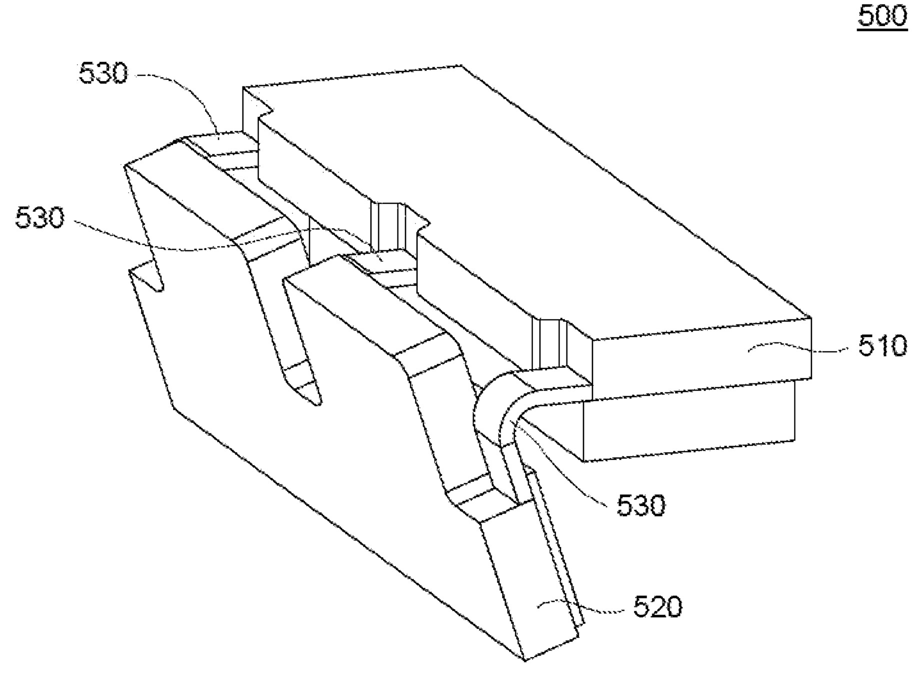
FIG. 5 shows a structure of an antenna module according to another embodiment of the application.
FIG. 6 shows an electronic mobile device 600 according to one embodiment of the application.

FIG. 5 shows a structure of an antenna module according to another embodiment of the application. The antenna module 500 is for example but not limited by, millimeter-Wave (mmW) module.

The antenna module 500 includes a plurality of metal surfaces 510, 520 and a plurality of connecting elements 530 for connecting between the metal surfaces 510 and 520. The metal surfaces 510, 520 may be used for improving the distance sensing plane coverage of the antenna module 500, compared with the antenna module 120 having a single metal surface (i.e. a single sensing surface). Each of the metal surfaces 510, 520 may be an antenna only, a metal sensing pad only, or both an antenna and a metal sensing pad, and not limited to mmW frequency band. Of course, at least one of the metal surfaces 510, 520 must be an antenna and/or a metal sensing pad. In one embodiment of the application, the connecting elements 530 for connecting between the metal surfaces 510 and 520 may be optional; and when the antenna module 500 does not include any connecting element 530, the metal surfaces 510 and 520 are formed on the surfaces of the electronic mobile device.

In other possible embodiments of the application, the antenna module 500 may include two, three or four metal surfaces, which is still within the spirit and the scope of the application. In other words, the antenna module 500 includes at least two metal surfaces.

Also, in other possible embodiments of the application, an intersection angle between the metal surfaces of the antenna module 500 may be any angle, if necessary, which is still within the spirit and the scope of the application.

FIG. 6 shows an electronic mobile device 600 according to one embodiment of the application. The electronic mobile device 600 according to one embodiment of the application includes the antenna module 500 and other elements (not shown). In FIG. 6, the antenna module 500 radiates toward the surfaces S5 and S2.

Similarly, when the surfaces S5 and S2 are chosen for the safety regulation verification as shown in FIG. 2, the possible transmitting power upper limits Plimit("X")_S5 and Plimit("X")_S2 may be both 11.8 dBm (11.8 dBm is an example, and Plimit("X") could be other value). Thus, the final transmitting power upper limit Plimit("X") for the antenna module 500 is determined as a smallest value among the respective transmitting power upper limits corresponding to the chosen surfaces. That is, in the above case, the transmitting power upper limit Plimit("X") for the antenna module 500 is a smaller value (11.8 dBm) among Plimit("X")_S5(=11.8 dBm) and Plimit("X")_S2=(11.8 dBm).

Figure 7:
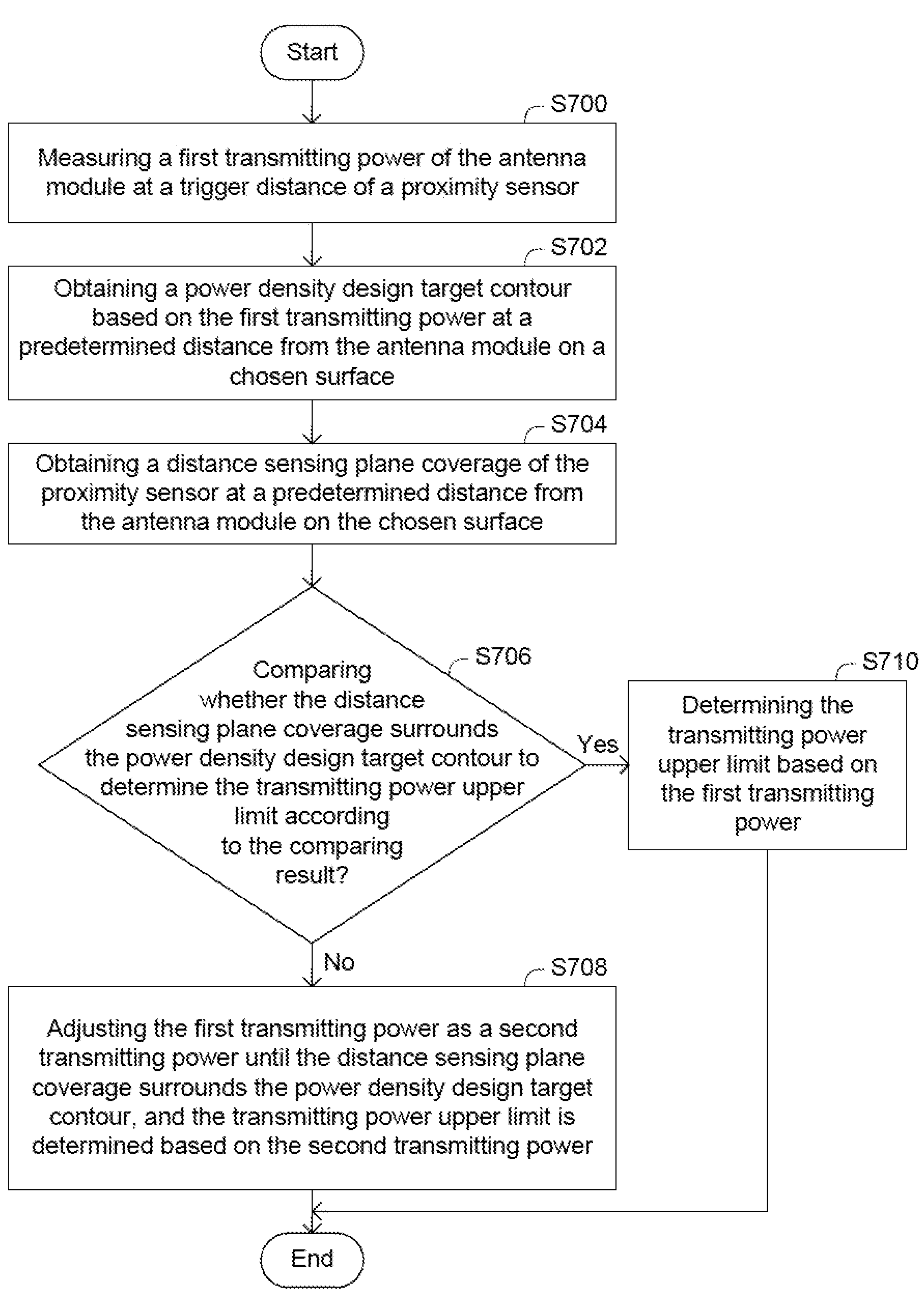
FIG. 7 shows a method for determining a transmitting power upper limit of an antenna module or an electronic device (or mobile device) according to one embodiment of the application.

FIG. 7 shows a method for determining a transmitting power upper limit of an antenna module or an electronic device (or mobile device) according to one embodiment of the application. In step S700, a first transmitting power of the antenna module at a trigger distance of a proximity sensor is measured.

In step S702, a power density design target contour is obtained based on the first transmitting power at a predetermined distance from the antenna module (or mobile device) on a chosen surface.

In step S704, a distance sensing plane coverage of the proximity sensor at a predetermined distance from the antenna module (or mobile device) on the chosen surface is obtained.

In step S706, whether the distance sensing plane coverage surrounds the power density design target contour is compared to determine the transmitting power upper limit according to the comparing result.

When the distance sensing plane coverage fails to surround the power density design target contour (no in step S706), in step S708, the first transmitting power is adjusted as a second transmitting power until the distance sensing plane coverage surrounds the power density design target contour, and the transmitting power upper limit is determined based on the second transmitting power. For example, the transmitting power upper limit is determined as being equal to the second transmitting power. The step of adjusting the first transmitting power in step S708 comprises: directly reducing the first transmitting power or reducing the trigger distance to reduce the first transmitting power.

When the distance sensing plane coverage surrounds the power density design target contour (yes in step S706), the transmitting power upper limit is determined based on the first transmitting power in step S710. For example, the transmitting power upper limit is determined as being equal to the first transmitting power.

In FIG. 7, the trigger distance of the proximity sensor is a pre-determined distance; or the trigger distance is determined corresponding to a proximity feature of the proximity sensor.

In FIG. 7, the proximity sensor is integrated in the antenna module, or the proximity sensor is external to the antenna module and adjacent to the antenna module.

The method of FIG. 7 further comprises: obtaining another power density design target contour at the determined distance from the antenna module (or mobile device) on another chosen surface; obtaining another distance sensing plane coverage of the proximity sensor at the predetermined distance from the antenna module (or mobile device) on the another chosen surface; comparing the another distance sensing plane coverage and the another power density design target contour on the another chosen surface; determining another transmitting power upper limit according to the comparing result; and selecting the smallest value from the transmitting power upper limit and another transmitting power upper limit as a final transmitting power upper limit.

In the method of FIG. 7, when the antenna is at the first transmitting power, the power density obtained on a plane at the trigger distance is less than or equal to a power density design target.

In the method of FIG. 7, wherein the power density design target contour is a contour including a plurality of points on the chosen surface equal to a power density design target.

In the method of FIG. 7, the distance sensing plane coverage of the proximity sensor is a closed shape obtained by mapping a proximity sensing feature of the proximity sensor on the chosen surface at the predetermined distance from the antenna module (or mobile device).

FIG. 1, FIG. 3, FIG. 4, FIG. 5 and FIG. 6 are also applicable to FIG. 7.

Therefore, in one embodiment of the application, because the antenna module has several metal surfaces, the antenna module having the proximity sensing features has wider distance sensing plane coverage and thus the increased transmitting power upper limit. When the transmitting power upper limit is increased, the transmitting efficiency is improved.

One embodiment of the application focuses on the application of millimeter-wave frequencies in handheld devices. The size range of the antenna elements falls within (λ/4) to (λ/2), where "λ" represents the wavelength of the millimeter-wave signal. When forming an antenna array, the individual antenna elements are typically scaled up by a multiple of the antenna element size, usually not exceeding 10 times.

One embodiment of the application introduces the safety regulation verification procedure for the antenna module having proximity sensing features, which can be utilized for the safety verification of mmW antenna modules. Additionally, one embodiment of the application ensures that during the product development stage, performance evaluation and optimization can be carried out following the safety regulation verification procedure.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A safety regulation verification method for a mobile device, the mobile device comprising an antenna module, the safety regulation verification method comprising:

measuring a first transmitting power of the antenna module at a trigger distance of a proximity sensor of the mobile device;

obtaining a power density design target contour based on the first transmitting power at a predetermined distance from the mobile device on a chosen surface;

obtaining a distance sensing plane coverage of the proximity sensor at the predetermined distance from the mobile device on the chosen surface;

comparing whether the distance sensing plane coverage surrounds the power density design target contour; and when the distance sensing plane coverage of the proximity sensor fails to surround the power density design target contour, adjusting the first transmitting power as a second transmitting power until the distance sensing plane coverage surrounds the power density design target contour.

2. The method according to claim 1, wherein after the step of adjusting the first transmitting power as the second transmitting power, determining a transmitting power upper limit based on the second transmitting power, and when the distance sensing plane coverage surrounds the power density design target contour, determining the transmitting power upper limit based on the first transmitting power.

3. The method according to claim 2, wherein the step of adjusting the first transmitting power comprises:

directly reducing the first transmitting power or reducing the trigger distance to reduce the first transmitting power.

4. The method according to claim 2, wherein the transmitting power upper limit is determined as being equal to the first transmitting power or the second transmitting power.

5. The method according to claim 1, wherein the proximity sensor is integrated in the antenna module, or the proximity sensor is external to the antenna module and adjacent to the antenna module.

6. The method according to claim 2, wherein further comprising:

obtaining another power density design target contour at the determined distance from the mobile device on another chosen surface;

obtaining another distance sensing plane coverage of the proximity sensor at the predetermined distance from mobile device on the another chosen surface;

comparing the another distance sensing plane coverage and the another power density design target contour on the another chosen surface;

determining another transmitting power upper limit according to the comparing result; and selecting the smallest value from the transmitting power upper limit and another transmitting power upper limit as a final transmitting power upper limit.

7. The method according to claim 1, wherein when the antenna is at the first transmitting power, a maximum power density obtained on a plane at the trigger distance is less than or equal to a power density design target.

8. The method according to claim 1, wherein the power density design target contour is a contour including a plurality of points on the chosen surface equal to a power density design target.

9. The method according to claim 1, wherein the distance sensing plane coverage of the proximity sensor is a closed shape obtained by mapping a proximity sensing feature of the proximity sensor on the chosen surface at the predetermined distance from the mobile device.

10. A method for determining a transmitting power upper limit of a mobile device, the mobile device comprising an antenna module, the method comprising:

measuring a first transmitting power of the antenna module at a trigger distance of a proximity sensor of the mobile device;

obtaining a power density design target contour based on the first transmitting power at a predetermined distance from the mobile device on a chosen surface;

obtaining a distance sensing plane coverage of the proximity sensor at a predetermined distance from the mobile device on the chosen surface;

comparing the distance sensing plane coverage and the power density design target contour on the chosen surface; and determining the transmitting power upper limit according to the comparing result.

11. The method according to claim 10, wherein the step of comparing the distance sensing plane coverage and the power density design target contour on the chosen surface comprises:

comparing whether the distance sensing plane coverage surrounds the power density design target contour.

12. The method according to claim 11, wherein when the distance sensing plane coverage fails to surround the power density design target contour, adjusting the first transmitting power as a second transmitting power until the distance sensing plane coverage surrounds the power density design target contour, and determining the transmitting power upper limit based on the second transmitting power, and when the distance sensing plane coverage surrounds the power density design target contour, determining the transmitting power upper limit based on the first transmitting power.

13. The method according to claim 12, wherein the step of adjusting the first transmitting power comprises:

directly reducing the first transmitting power or reducing the trigger distance to reduce the first transmitting power.

14. The method according to claim 10, wherein the trigger distance of the proximity sensor is a predetermined distance; or the trigger distance is determined corresponding to a proximity feature of the proximity sensor.

15. The method according to claim 10, wherein the proximity sensor is integrated in the antenna module, or the proximity sensor is external to the antenna module and adjacent to the antenna module.

16. The method according to claim 10, wherein further comprising:

obtaining another power density design target contour at the determined distance from the mobile device on another chosen surface;

obtaining another distance sensing plane coverage of the proximity sensor at the predetermined distance from the mobile device on the another chosen surface;

comparing the another distance sensing plane coverage and the another power density design target contour on the another chosen surface;

determining another transmitting power upper limit according to the comparing result; and selecting the smallest value from the transmitting power upper limit and another transmitting power upper limit as a final transmitting power upper limit.

17. The method according to claim 10, wherein when the antenna is at the first transmitting power, the power density obtained on a plane at the trigger distance is less than or equal to a power density design target.

18. The method according to claim 12, wherein the power density design target contour is a contour including a plurality of points on the chosen surface equal to a power density design target.

19. The method according to claim 12, wherein the distance sensing plane coverage of the proximity sensor is a closed shape obtained by mapping a proximity sensing feature of the proximity sensor on the chosen surface at the predetermined distance from the mobile device.

20. A method for determining a transmitting power upper limit of an antenna module, the method comprising:

measuring a first transmitting power of the antenna module at a trigger distance of a proximity sensor;

obtaining a power density design target contour based on the first transmitting power at a predetermined distance from the antenna module on a chosen surface;

obtaining a distance sensing plane coverage of the proximity sensor at a predetermined distance from the antenna module on the chosen surface;

comparing the distance sensing plane coverage and the power density design target contour on the chosen surface; and determining the transmitting power upper limit according to the comparing result.

* * * * *